(12) United States Patent
Metzger et al.

(10) Patent No.: US 10,944,265 B2
(45) Date of Patent: Mar. 9, 2021

(54) METHOD FOR THE COMPUTER-AIDED CONTROL OF THE POWER IN AN ELECTRICAL GRID

(71) Applicant: Siemens Aktiengesellschaft, Munich (DE)

(72) Inventors: Michael Metzger, Markt Schwaben (DE); Ulrich Münz, Plainsboro, NJ (US); Philipp Wolfrum, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 182 days.

(21) Appl. No.: 15/766,246

(22) PCT Filed: Aug. 31, 2016

(86) PCT No.: PCT/EP2016/070517
§ 371 (c)(1),
(2) Date: Jul. 3, 2018

(87) PCT Pub. No.: WO2017/063785
PCT Pub. Date: Apr. 20, 2017

(65) Prior Publication Data
US 2018/0301901 A1 Oct. 18, 2018

(30) Foreign Application Priority Data
Oct. 13, 2015 (DE) .......................... 10 2015 219 808

(51) Int. Cl.
*H02J 3/14* (2006.01)
*H02J 3/38* (2006.01)
*H02J 3/46* (2006.01)

(52) U.S. Cl.
CPC ................. *H02J 3/14* (2013.01); *H02J 3/38* (2013.01); *H02J 3/386* (2013.01); *H02J 3/46* (2013.01);
(Continued)

(58) Field of Classification Search
CPC ........ H02J 3/14; H02J 3/38; H02J 3/46; H02J 3/386; H02J 2003/007; Y04S 20/222; Y02B 70/3225
(Continued)

(56) References Cited

U.S. PATENT DOCUMENTS

2010/0145533 A1 6/2010 Cardinal et al.
2014/0074311 A1* 3/2014 Kearns ...................... H02J 3/38
700/297

(Continued)

FOREIGN PATENT DOCUMENTS

DE 102013221750 A1 5/2014

OTHER PUBLICATIONS

Münz Ulrich et al: "Predictive Decision Support to Protect Power Systems against Wind Farm Drop Outs"; IEEE Eindhoven PowerTech; IEEE Xplore; DOI:10.1109/PTC.2015.7232430.
(Continued)

*Primary Examiner* — Mohammad Ali
*Assistant Examiner* — Saad M Kabir
(74) *Attorney, Agent, or Firm* — Schmeiser, Olsen & Watts LLP

(57) ABSTRACT

A method for computer-supported control of the power in an electrical power supply network, including a plurality of nodes which are connected to one another via power lines, each containing a first energy generator and/or a second energy generator and/or an energy consumer is provided. A power estimation is provided for each node, which is composed of an estimation of the future load of the energy consumer and an estimation of the future power of the second regenerative energy generator in the respective node. Fluctuations of a first type of the power estimations for the respective nodes are permitted in a first predetermined tolerance region, and fluctuations of a second type of the (Continued)

power estimations are permitted in a second predetermined tolerance region. The fluctuations of the first type are compensated by primary balancing power and the fluctuations of the second type are compensated by secondary balancing power.

17 Claims, 1 Drawing Sheet

(52) U.S. Cl.
CPC ....... *H02J 2203/20* (2020.01); *Y02B 70/3225* (2013.01); *Y04S 20/222* (2013.01)

(58) Field of Classification Search
USPC ........................................................ 700/295
See application file for complete search history.

(56) References Cited

U.S. PATENT DOCUMENTS

| 2014/0265574 A1 | 9/2014 | Tyler et al. |
| 2016/0258361 A1* | 9/2016 | Tiwari ..................... F02C 9/00 |
| 2016/0276835 A1 | 9/2016 | Heyde et al. |

OTHER PUBLICATIONS

Hobollah Ayman et al: "Dynamic Stability and Network Constrained Optimal Spinning Reserve Allocation"; Proc. IEEE Power and Energy Soc. General Meeting 2011; IEEE Xplore; DOI:10.1109/PES.2011.6039906; 2011.
H. Berndt et al: "TransmissionCode 2007, Network and System Rules of the German Transmission System Operators" (Netz-und Systemregeln der deutschen Übertragungsnetzbetreiber), Verband der Netzbetreiber VDN e.V. beim VDEW, Aug. 2007 edition.
PCT International Search Report for PCT International Application No. PCT/EP2016/070517, dated Aug. 31, 2016.

* cited by examiner

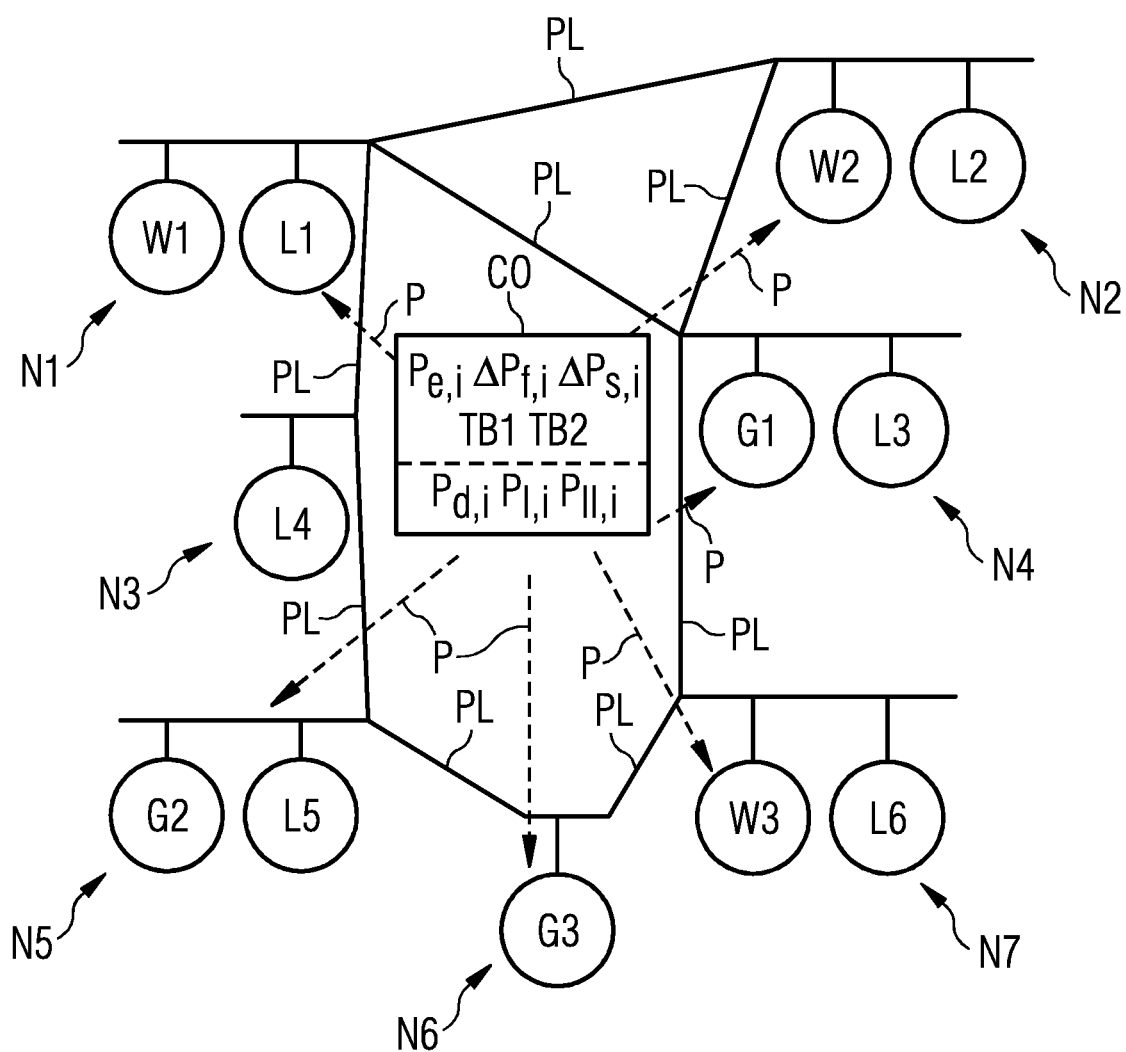

METHOD FOR THE COMPUTER-AIDED CONTROL OF THE POWER IN AN ELECTRICAL GRID

CROSS-REFERENCE TO RELATED APPLICATIONS

This application claims priority to PCT Application No. PCT/EP2016/070517, having a filing date of Aug. 31, 2016, based off of German application No. DE 102015219808.1 having a filing date of Oct. 13, 2015, the entire contents of both of which are hereby incorporated by reference.

FIELD OF TECHNOLOGY

The following relates to a method for the computer-aided control of the electrical power in an electrical grid and to a corresponding apparatus. Here and below, power should be understood as meaning active power. Here and below, a grid should be understood as meaning an AC grid (single-phase or multiphase AC system).

BACKGROUND

Regenerative energy producers, such as photovoltaic and wind power installations, are nowadays increasingly used in electrical grids. On account of the uncertain prediction of the electrical power of such regenerative installations and a variable energy consumption in the grid, the production capacities which can be used at various nodes of the grid can often only be estimated. It is therefore difficult to optimally hold control power in the form of primary control power and secondary control power and to simultaneously ensure stable grid operation in this case.

SUMMARY

An aspect relates to providing a method for the computer-aided control of the power in an electrical grid, which method is used to provide primary control power and secondary control power even in the case of uncertainties in the prediction of the electrical feed power or power production of individual nodes and to simultaneously ensure stable grid operation.

The method according to embodiments of the invention is used to control the electrical power in an electrical grid. The grid has, in a manner known per se, a predefined nominal frequency which is at 50 Hz, for example. The grid comprises a plurality of nodes which are connected to one another via power lines and each comprise a first energy producer from one or more non-regenerative energy production installations and/or a second energy producer from one or more regenerative energy production installations and/or a consumer from one or more energy consumption units. Here and below, energy producers and energy production installations should be understood as meaning electrical energy producers and electrical energy production installations. The non-regenerative energy production installations are generally thermal power plants which convert thermal energy produced by means of fossil fuels, for example, into electrical energy. In contrast, the regenerative energy production installations are photovoltaic or wind power installations, for example.

The grid contains both one or more first and second energy producers and one or more energy consumers. A power estimate is predefined for a respective node and is composed of an estimate of the future drawn power (load) of the energy consumer (if present in the node) and an estimate of the regenerative power produced in the future by the second energy producer (if present) in the respective node. If the respective node does not contain an energy consumer or a second energy producer, the corresponding estimate of the load or power is set to zero.

Furthermore, fluctuations or uncertainties in the power estimates of a first type are allowed for the respective nodes in a first predefined tolerance range and fluctuations or uncertainties in the power estimates of a second type are allowed for the respective nodes in a second predefined tolerance range. In this case, the fluctuations of the first type should be compensated for by primary control power in the grid and the fluctuations of the second type should be compensated for by secondary control power.

The terms of primary control power and secondary control power are sufficiently well known to a person skilled in the art. The primary control power is used to compensate for fast frequency fluctuations. The primary control power is usually provided by means of proportional control in which the primary control power is generated in proportion to the deviation of the grid frequency in the grid from the nominal frequency. In contrast to the primary control power which is available on a time scale of seconds, the secondary control power is provided on a longer time scale of several minutes. Consequently, the fluctuations of the first type which occur suddenly and are therefore usually smaller are compensated for using primary control power, whereas the fluctuations of the second type which are usually produced over longer periods of 15 minutes, for example, and are therefore slower and larger are compensated for using secondary control power.

In the method according to embodiments of the invention, in a step a), a steady state of the grid, in which a steady-state grid frequency is established for all voltages or voltage phasors of the nodes in the grid, is first of all modeled. On the basis of the solution to the optimization problem, in a step b), an optimization problem is solved. Primary control powers (to be held) and secondary control powers (to be held) are allocated to the respective nodes (that is to say are set in the respective nodes) by means of the modeled steady state on the basis of the power estimates and the first and second tolerance ranges in such a manner that the deviation of the steady-state grid frequency from the nominal frequency and the power on the power lines are limited. Taking into account the first and second tolerance ranges results in the limitation of the deviation of the steady-state grid frequency from the nominal frequency and the limitation of the power on the power lines applying to all permissible powers or loads within the first and second tolerance ranges.

According to embodiments of the invention, the secondary conditions of a limited frequency deviation and of a power limitation of the power lines are included in the optimization problem. Corresponding threshold value criteria for the frequency deviation and the power limitation are stipulated in this case. A primary or secondary control power of zero is allocated to those nodes which cannot provide any primary or secondary control power. The primary control power is preferably provided by the first energy producers, but may possibly also be held by second energy producers. The same applies to the secondary control power.

The method according to embodiments of the invention is distinguished by a suitable definition of an optimization problem on the basis of a modeled steady state of the grid. Stable grid operation is ensured and, at the same time, the provision of primary control power and secondary control power even in the case of deviations of the energy production and energy consumption from the estimated values within the tolerance ranges is ensured by solving the optimization problem by means of corresponding secondary conditions.

In one preferred embodiment of the method according to embodiments of the invention, in step b), in addition to allocating the primary control powers and the secondary control powers to the respective nodes, planned powers of the first (non-regenerative) energy producers of the nodes are determined and accordingly set, with the result that the deviation of the steady-state grid frequency from the nominal frequency and the power on the power lines are limited. The future distribution of the power from the first energy producers is therefore included as a further variable to be optimized in the solution of the optimization problem. If the power from a first energy producer is stipulated in advance and cannot be manipulated, its planned power corresponds to the previously stipulated power.

In another variant of the method according to embodiments of the invention, the optimization problem is defined as an optimization of a cost function which contains a sum of a plurality of cost terms. In this case, the cost terms comprise a first cost term for the primary control powers allocated to the respective nodes or deviations of these primary control powers from predefined desired values and/or a second cost term for the secondary control powers allocated to the respective nodes or deviations of these secondary control powers from predefined desired values. In one preferred variant, the optimization problem is defined in this case as a minimization of the cost function, the first and second cost terms being represented by positive values. The first cost term preferably depends, in a linear or quadratic manner, on the primary control powers or the deviations of these primary control powers from the predefined desired values. In a similar manner, the second cost term preferably also depends, in a linear or quadratic manner, on the secondary control powers or the deviations of these secondary control powers from predefined desired values. Examples of possible cost functions are given in the specific description.

In another particularly preferred embodiment in which planned powers produced by the first energy producers are also determined, the cost function also comprises a third cost term for the planned powers produced by the first energy producers or for deviations of these powers from desired values. In this case, the optimization problem is preferably again defined as a minimization of the cost function, the third cost term being a positive value in this case. This cost term preferably depends, in a linear or quadratic manner, on the planned powers produced by the first energy producers or the deviations of these powers from the desired values.

In another particularly preferred embodiment, the steady state of the grid is modeled in step a) on the basis of load flow equations for the powers occurring in the respective nodes. The description of a steady state of a grid by means of load flow equations is known per se. The so-called DC load flow equations (DC approximation), which are also specified in the specific description, are used here in one particularly preferred embodiment. The grid is modeled in a simple and computationally efficient manner by means of the load flow equations.

In another preferred embodiment of the method according to embodiments of the invention, the first tolerance range is defined in such a manner that the fluctuation of the first type in the power estimate is in a predetermined tolerance interval for each node. Alternatively or additionally, the second tolerance range is also defined in such a manner that the fluctuation of the second type in the power estimate is in a predetermined tolerance interval for each node. In other words, tolerance intervals are stipulated independently of one another for the fluctuations in the power estimate for the individual nodes.

In another variant of the method according to embodiments of the invention, the first tolerance range is defined in such a manner that a sum, and in particular a weighted sum, of the fluctuations of the first type in the power estimates is less than or is less than or equal to a predetermined value for all modes. Alternatively or additionally, the second tolerance range is also defined in such a manner that a sum, and in particular a weighted sum, of the fluctuations of the second type in the power estimates is less than or is less than or equal to a predetermined value for all nodes. In this variant, the tolerances for the fluctuations in the power estimates of the individual nodes depend on one another.

In another variant of the method according to embodiments of the invention, when solving the optimization problem, the (further) secondary condition, whereby the planned powers from the first energy producers and/or the primary control powers and/or secondary control powers allocated to the respective nodes are limited, is taken into account.

In another particularly preferred embodiment, the optimization problem is converted into a convex optimization problem as part of its solution. A convex optimization problem is distinguished by the fact that the corresponding optimum (preferably a minimum) is a global optimum. Such an optimization problem can be solved in a particularly simple and efficient manner using methods which are known per se, for example the interior point method.

In addition to the method described above, embodiments of the invention relate to an apparatus for the computer-aided control of the electrical power in an electrical grid, the apparatus comprising one or more means for carrying out the method according to embodiments of the invention or one or more variants of the method according to the invention.

Embodiments of the invention also relate to an electrical grid which comprises the above-described apparatus according to the invention for controlling the electrical power in the grid.

BRIEF DESCRIPTION

Some of the embodiments will be described in detail, with reference to the following figures, wherein like designations denote like members, wherein:

FIG. 1 depicts a grid in which power is controlled according to embodiments of a method of the present invention.

DETAILED DESCRIPTION

FIG. 1 schematically shows an AC grid having a plurality of buses or nodes N1 to N7 which are networked to one another via power lines PL. Depending on the configuration, the nodes may comprise a non-regenerative energy producer (that is to say one or more thermal power plants) and/or a regenerative energy producer (that is to say one or more regenerative energy production installations, for example photovoltaic or wind power installations) and/or an energy consumer or load (that is to say one or more energy consumption units). In the example in FIG. 1, the node N1 contains the regenerative energy producer W1 and the load L1, the node N2 contains the regenerative energy producer W2 and the load L2, the node N3 contains the load L4, the node N4 contains the non-regenerative energy producer G1 and the load L3, the node N5 contains the non-regenerative energy producer G2 and the load L5, the node N6 contains the non-regenerative energy producer G3, and the node N7 contains the regenerative energy producer W3 and the load L6.

A control apparatus CO is provided for the purpose of implementing embodiments of the invention and passes the power values determined according to embodiments of the invention to the individual nodes which are then set according to the power values. The transmission of the power values is indicated in FIG. 1 by dashed arrows P.

As input variables of the embodiment described here, the control apparatus CO uses estimated powers $P_{e,i}$ of the individual nodes as well as a first tolerance range TB1 for fast power fluctuations $\Delta P_{f,i}$ of the individual nodes and a second tolerance range TB2 for slow power fluctuations $\Delta P_{s,i}$ of the individual nodes. Here and below, i denotes the index of the numbering of the individual nodes, that is to say, for the example in FIG. 1, i=1, . . . , 7. The input variables mentioned are explained in detail further below.

As output variables, planned powers $P_{d,i}$ produced by the non-regenerative energy producers of the individual nodes (if present therein) as well as primary control powers $P_{I,i}$ and secondary control powers $P_{II,i}$ to be held for a predefined time horizon (that is to say a future period) are determined by means of the control apparatus CO and the nodes are set accordingly. Depending on the type of grid, the primary control power and the secondary control power can be held only by the non-regenerative energy producers or possibly also by regenerative and non-regenerative energy producers.

The embodiment of the invention described here is distinguished by a formulation and suitable solution of an optimization problem, which is as follows:

A grid containing estimates $P_{e,i}$ for the future power from the regenerative energy producers and for the future load is taken as a basis, in which case tolerance or uncertainty ranges TB1 and TB2 for fluctuations in these estimates are also predefined. In this case, the uncertainty range TB1 relates to fast power fluctuations $\Delta P_{f,i}$ which can be compensated for using primary control power, and the uncertainty range TB2 relates to slower power fluctuations $\Delta P_{s,i}$ which can be compensated for using secondary control power. On the basis of this grid, an optimization problem is solved, with the result that the planned powers $P_{d,i}$ produced by the non-regenerative energy producers and the allocation of primary control power and secondary control power to corresponding nodes are stipulated in such a manner that, in a steady state of the grid, the maximum frequency deviation of the grid frequency of the grid from its nominal frequency and the power on the power lines PL remain within predetermined limits, and this applies to any deviations of the power production and load within the tolerance or uncertainty ranges TB1 and TB2.

The planning of the power from the non-regenerative energy producers over a fixed time horizon is considered below. This time horizon is, for example, 24 hours, in which case the corresponding power values are determined on the basis of the method according to embodiments of the invention every 15 minutes, for example. A stable grid state is present in this case when the maximum deviation of the grid frequency from the nominal frequency is below a predetermined threshold and, in the same manner, the maximum phase difference across each power line is limited, thus avoiding overloading of the power lines.

The starting point of the method described here is the computer-aided modeling of a steady state of the grid. In this case, the grid comprises N buses or nodes and M power lines. The steady state is modeled by means of the linearized DC load flow equations which are known per se and describe the active power produced in each node on the basis of voltages and phase differences. The index $t_n$ which defines the corresponding variables at times within the above-mentioned time horizon is also used below. The DC load flow equations are as follows:

$$P_i^{t_n} = -\sum_{k \in N_i} b_{ik} v_i^{t_n} v_k^{t_n} (\theta_k^{t_n} - \theta_i^{t_n}) \qquad (1)$$

This sum comprises all adjacent nodes or buses $k \in N_i$ which are directly connected to the node i via a power line having the susceptance $b_{ik}<0$. $P_i^{t_n}$, $v_i^{t_n}$, $\theta_i^{t_n}$ denote the active power, the voltage amplitude and the phase at each node i for the discrete times $t_n$. Only power transmission systems in which the susceptance of the power lines dominates their conductance are considered below, with the result that the DC load flow equation gives a good approximation of the actual load flow. As is customary in DC load flow equations, all $v_i$ are constant and $v_i^{t_n}=v_i$ applies to all $t_n$.

The above DC load flow equations (1) describe a lossless system, that is to say:

$$\sum_{i=1}^{N} P_i^{t_n} = -\sum_{i=1}^{N} \sum_{k \in N_i} b_{ik} v_i v_k (\theta_k^{t_n} - \theta_i^{t_n}) = 0 \qquad (2)$$

The total power which occurs at a node i is as follows:

$$P_i^{t_n} = P_{e,i}^{t_n} + P_{d,i}^{t_n} + P_{II,i}^{t_n} + P_{I,i}^{t_n} + \Delta P_{s,i}^{t_n} + \Delta P_{f,i}^{t_n} \qquad (3)$$

In this case, $P_i^{t_n}>0$ if more power is produced than is consumed in the node i at the time $t_n$. Otherwise, $P_i^{t_n} \leq 0$. Furthermore, the variables in equation (3) are defined as follows:

$P_{e,i}^{t_n}$ is a power estimate at the node i at the time $t_n$, the power estimate being composed of the load (if present) and the regenerative power produced by the regenerative energy producer (if present).

$P_{d,i}^{t_n}$ represents the planned power produced by the non-regenerative energy producer (if present) in the node i at the time $t_n$.

$P_{II,i}^{t_n}$ is the secondary control power which is provided or held at the node i at the time $t_n$ (if present).

$P_{I,i}^{t_n}$ is the primary control power which is provided or held at the node i at the time $t_n$ (if present).

$\Delta P_{s,i}^{t_n}$ and $\Delta P_{f,i}^{t_n}$ describe the uncertainty or fluctuation in the load and the produced regenerative power in comparison with the estimate $P_{e,i}^{t_n}$ at the node i at the time $t_n$. In this case, $\Delta P_{s,i}^{t_n}$ relates to slow uncertainties or fluctuations which occur, for example, within a few minutes and can be compensated for using the secondary control power. In contrast, $\Delta P_{f,i}^{t_n}$ relates to fast fluctuations or uncertainties which occur, for example, within seconds and are compensated for using the primary control power. Generally, $\Delta P_{f,i}^{t_n} < \Delta P_{s,i}^{t_n}$.

The secondary control power compensates for the powers by adapting the production of the active power to slow variations in the load or the regenerative powers. This can be achieved by integrating the frequency deviation $\Delta f^{t_n} = f^{t_n} - f_0$ from the nominal frequency $f_0$ of the grid in order to determine the required power adaptation if $\Delta f^{t_n}$ becomes zero. The resulting adaptation of the active power must be distributed across the various energy producers. The algorithm for setting the secondary control power has shorter execution intervals than the optimization algorithm according to embodiments of the invention, for example one minute. Consequently, the distribution of the secondary control power must be determined in advance, that is to say without the information relating to the exact distribution of $\Delta P_{s,i}^{t_n}$. However, the activation of the secondary control power depends on the magnitude of the variation in the load and the regenerative power produced, that is to say on $\Sigma_{i=1}^{N} \Delta P_{s,i}^{t_n}$. It is an advantage of the method described here that the secondary control power is based only on the overall variation $\Sigma_{i=1}^{N} \Delta P_{s,i}^{t_n}$ and the exact distribution of the variation $\Delta P_{s,i}^{t_n}$ does not have to be known. The overall variation can be determined in a relatively simple manner by integrating the frequency deviation $\Delta f^{t_n}$, for example. Therefore, in the embodiment described here, the distribution of the secondary control power is modeled as follows:

$$P_{II,i}^{t_n} = -k_{S,i}^{t_n} \sum_{j=1}^{N} \Delta P_{s,j}^{t_n}, \quad \sum_{i=1}^{N} k_{S,i}^{t_n} = 1 \tag{4}$$

An aim of the optimization described below is to optimally determine the distribution $k_{S,i}^{t_n}$ of the secondary control power.

The above equation (4) implies the following condition:

$$\sum_{i=1}^{N} (P_{II,i}^{t_n} + \Delta P_{s,i}^{t_n}) = 0 \tag{5}$$

That is to say, the fluctuations $\Delta P_{s,i}^{t_n}$ are completely compensated for by the secondary control power $P_{II,i}^{t_n}$. As known, the primary control power reacts much more quickly than the secondary control power, to be precise on a time scale which depends on the deviation of the grid frequency from the nominal frequency. In this case, the primary control power is described in a manner known per se using the following proportional control:

$$P_{I,i}^{t_n} = -k_{P,i}^{t_n} \Delta f^{t_n} \tag{6}$$

In this case, $P_{I,i}^{t_n}$ denotes the primary control power which is provided at the node i at the time $t_n$, as already mentioned above. This primary control power is proportional to the frequency deviations $\Delta f^{t_n}$, which is achieved via the proportionality factor (also referred to as droop gain) $k_{P,i}^{t_n} \geq 0$. This proportionality factor $k_{P,i}^{t_n}$ conventionally comprises the two following independent aspects:

Grid and system rules, that is to say how a frequency deviation $\Delta f^{t_n}$ is translated into the ratio of the actually provided primary control power to the maximum available primary control power (that is to say $P_{I,i}^{t_n}/P_{I,i,max}^{t_n}$) ptn The maximum primary control power $P_{I,i}^{t_n}$ which can be provided by the node i, for example for the maximum frequency deviation $\Delta f^{t_n} = \overline{\Delta f} = 0.18$ Hz, where the primary control power to be provided by individual energy producers is currently determined in Europe using auctions.

It is also assumed below that the power produced using the non-regenerative energy producers and the power estimates are compensated for, that is to say:

$$\sum_{i=1}^{N} (P_{e,i}^{t_n} + P_{d,i}^{t_n}) = 0 \tag{7}$$

This condition applies to all times $t_n$.

Using the above equations (2), (3), (5) and (7), the frequency deviation at the time $t_n$ can be described as follows:

$$\Delta f^{t_n} = \frac{\sum_{i=1}^{N} \Delta P_{f,i}^{t_n}}{\sum_{i=1}^{N} k_{P,i}^{t_n}} = \frac{1^T \Delta P_f^{t_n}}{1^T k_P^{t_n}} \tag{8}$$

In this case, symbols printed in bold below are used to indicate corresponding vectors, for example $(k_P^{t_n})^T = \text{vec}(k_{P,i}^{t_n}) = (1, 1, 1, \ldots, 1)$ etc. The following primary control power therefore results:

$$P_I^{t_n} = -k_P^{t_n} \frac{1^T \Delta P_f^{t_n}}{1^T k_P^{t_n}} \tag{9}$$

This implies that $\Delta f^{t_n} = 0$ if $1^T \Delta P_f^{t_n} = 0$. Therefore, the primary control power can be activated only in order to compensate for fast uncertainties or fluctuations in the estimated load and/or regenerative feed power/power production.

The so-called incidence matrix of a graph which describes the topology of the grid is introduced below. This incidence matrix is as follows:

$$B_{i\alpha} = \begin{cases} 1 & \text{if power line } \alpha \text{ starts at the node } i \\ -1 & \text{if power line } \alpha \text{ ends at the node } i \\ 0 & \text{otherwise} \end{cases} \tag{10}$$

This is a sparsely occupied matrix with only two entries 1 and −1 in each column $\alpha$, the rows corresponding to nodes which are directly connected via the power line $\alpha$. The expression $B^T \theta$ provides a vector of the magnitude M (number of power lines) with the entries $\theta_i - \theta_j$ corresponding to the phase difference on each power line.

The diagonal coupling matrix $\psi = \text{diag}(\psi_\alpha) = \text{diag}(-b_{ik}v_iv_k)$ is additionally defined, the power line $\alpha$ connecting the nodes i and k. Consequently, the above equation (1) can be written in vector form as follows:

$$P^{t_n} = B\psi B^T \theta^{t_n} \tag{11}$$

The following expression is obtained by combining equations (3), (4), (9) and (11):

$$P_e^{t_n} + P_d^{t_n} + (\mathbb{I} - k_S^{t_n} 1^T)\Delta P_s^{t_n} + \left(\mathbb{I} - \frac{k_P^{t_n} 1^T}{1^T k_P^{t_n}}\right)\Delta P_f^{t_n} = B\psi B^T \theta^{t_n} \quad (12)$$

In this case, $\mathbb{I}$ denotes the identity matrix.

In order to explicitly calculate the phase differences of the voltages across all power lines $B^T \theta^{t_n}$, an explicit solution for $B^T \theta^{t_n}$ must be found in equation (12). This is not trivial since $B\psi B^T$ is a singular matrix and therefore cannot be inverted. It is clear from the construction of $L=B\psi B^T$ that L is a Laplace matrix with exactly one eigenvalue of 0 and otherwise strictly positive eigenvalues. The left and right eigenvectors with the eigenvalue 0 are 1. Since the left side of equation (12) always satisfies the condition $1^T P^{t_n}=0$, the pseudo-inverse of L, referred to as $L^\dagger$ can be used and the following expression is obtained:

$$B^T \theta^{t_n} = B^T L^\dagger \left(P_e^{t_n} + P_d^{t_n} + (\mathbb{I} - k_S^{t_n} 1^T)\Delta P_s^{t_n} + \left(\mathbb{I} - \frac{k_P^{t_n} 1^T}{1^T k_P^{t_n}}\right)\Delta P_f^{t_n}\right)$$

The general case of non-identical, temporally constant power limitations on the power lines is considered below, that is to say: $|\psi_\alpha(\theta_i^{t_n} - \theta_k^{t_n})| \leq \tilde{\gamma}_\alpha$ for the power line $\alpha$. This is modeled by using different weights $$\omega_\alpha = \frac{|\psi_\alpha|}{\tilde{\gamma}_\alpha}$$

with the corresponding weighting matrix $W=\text{diag}(\omega_\alpha)$. The following inequality condition is obtained in this manner:

$$\left|WB^T L^\dagger \left(P_e^{t_n} + P_d^{t_n} + (\mathbb{I} - k_S^{t_n} 1^T)\Delta P_s^{t_n} + \left(\mathbb{I} - \frac{k_P^{t_n} 1^T}{1^T k_P^{t_n}}\right)\Delta P_f^{t_n}\right)\right| < \gamma 1 \quad (13)$$

In this case, $\gamma$ denotes a scalar parameter which describes the power line load. As soon as $\gamma>1$, at least one power line is overloaded. Otherwise, $\gamma \leq 1$. The above equation (13) describes a limitation of the power on the power lines in the sense of the claims and describes a secondary condition of the optimization problem formulated further below.

The optimization problem mentioned at the outset is formally described below. The above secondary condition according to equation (13) and the following reformulations can be combined with different cost functions depending on the use of the method. Examples of cost functions are as follows:

For a grid without a market for buying and selling energy and primary and secondary control power, the grid operator can directly take the total plannable non-regenerative energy production and the primary and secondary control power into account in the cost function using linear or quadratic costs. One example of a linear cost function which should be minimized when solving the optimization problem is as follows:

$$\min \sum_{t_n=0}^{T_n} c_d^T P_d^{t_n} + c_P^T k_P^{t_n} + c_S^T |k_S^{t_n}| \quad (14)$$

In the same manner, a quadratic cost function can also be defined as follows:

$$\min \sum_{t_n=0}^{T_n} (P_d^{t_n})^T C_d P_d^{t_n} + (k_P^{t_n})^T C_P k_P^{t_n} + (k_S^{t_n})^T C_S k_S^{t_n} \quad (15)$$

In this case, the variables $c_d$, $c_P$, $c_S$, $C_d$, $C_P$, $C_S$ denote the respective costs of fixed power limitations $\gamma$, and $T_n$ is the prediction horizon for planning the power from the non-regenerative energy producers. The variables $P_d^{t_n}$ and $k_P^{t_n}$ are constructed as positive values, with the result that absolute values are not required. In other scenarios, these variables may also be negative, with the result that absolute values are used in that case.

In a grid, there may be a market for energy, but not for primary and secondary control power. In this case, the grid operator cannot plan the entire non-regenerative production capacity, but rather must take into account modifications which result from trading the energy on the energy market. These modifications should be as small as possible. A typical linear cost function for this case is as follows:

$$\min \sum_{t_n=0}^{T_n} c_d^T |P_d^{t_n} - \hat{P}_d^{t_n}| + c_P^T k_P^{t_n} + c_S^T |k_S^{t_n}| \quad (16)$$

A typical quadratic cost function for this case is as follows:

$$\min \sum_{t_n=0}^{T_n} (P_d^{t_n} - \hat{P}_d^{t_n})^T C_d (P_d^{t_n} - \hat{P}_d^{t_n}) + (k_P^{t_n})^T C_P k_P^{t_n} + (k_S^{t_n})^T C_S k_S^{t_n} \quad (17)$$

In this case, $\hat{P}_d^{t_n}$ denotes a desired value of the non-regenerative feed power/power production resulting from the energy market. The cost term $c_d^T |P_d^{t_n} - \hat{P}_d^{t_n}|$ or $(P_d^{t_n} - \hat{P}_d^{t_n})^T C_d (P_d^{t_n} - \hat{P}_d^{t_n})$ is also referred to as re-dispatch costs in this case.

In a grid, both the energy produced and the primary and secondary control power may also be traded on the energy market. In this case, there are desired values both for the feed power $\hat{P}_d^{t_n}$ and for the primary control power and the secondary control power, the desired value for the primary control power being represented by the parameter $\hat{k}_P^{t_n}$ and the desired value for the secondary control power being represented by the parameter $\hat{k}_S^{t_n}$. The modifications should again be as small as possible. A typical linear cost function in this case is as follows:

$$\min \sum_{t_n=0}^{T_n} c_d^T |P_d^{t_n} - \hat{P}_d^{t_n}| + c_P^T |k_P^{t_n} - \hat{k}_P^{t_n}| + c_S^T |k_S^{t_n} - \hat{k}_S^{t_n}| \quad (18)$$

In contrast, a typical quadratic cost function is as follows:

$$\min \sum_{t_n=0}^{T_n} (P_d^{t_n} - \hat{P}_d^{t_n})^T C_d (P_d^{t_n} - \hat{P}_d^{t_n}) + \quad (19)$$

$$(k_P^{t_n} - \hat{k}_P^{t_n})^T C_P (k_P^{t_n} - \hat{k}_P^{t_n}) + (k_S^{t_n} - \hat{k}_S^{t_n})^T C_S (k_S^{t_n} - \hat{k}_S^{t_n})$$

If necessary, yet further terms may also be taken into account in the above cost functions, for example the minimization of the power limits γ of the lines for predefined limits of the non-regenerative energy production and the primary and secondary control power.

A grid with the above cost function (14) is considered in the exemplary embodiment described here. Similar results can be derived for the other cost functions. In this case, the optimization problem can be described as the following minimization problem of the cost function:

$$\min_{\substack{k_P^{t_n} \in K_P^{t_n} \\ k_S^{t_n} \in K_S^{t_n} \\ P_d^{t_n} \in P_T^{t_n}}} \max_{\substack{\Delta P_f^{t_n} \in P_F^{\infty,1,t_n} \\ \Delta P_s^{t_n} \in P_S^{\infty,1,t_n}}} \sum_{t_n=0}^{T_n} c_d^T P_d^{t_n} + c_P^T k_P^{t_n} + c_S^T |k_S^{t_n}| \quad (20a)$$

under the secondary conditions:

$$\left| WB^T L^\dagger \left( P_e^{t_n} + P_d^{t_n} + (\mathbb{1} - k_S^{t_n} \mathbb{1}^T)\Delta P_s^{t_n} + \left(\mathbb{1} - \frac{k_P^{t_n} \mathbb{1}^T}{\mathbb{1}^T k_P^{t_n}}\right)\Delta P_f^{t_n} \right) \right| < \gamma \mathbb{1} \quad (20b)$$

$$\mathbb{1}^T k_S^{t_n} = 1 \quad (20c)$$

$$\left| \frac{\mathbb{1}^T \Delta P_f^{t_n}}{\mathbb{1}^T k_P^{t_n}} \right| = \overline{\Delta f} \quad (20d)$$

Compliance with the above tolerance ranges TB1 and TB2 is ensured with the maximization contained in equation (20a). The power limitation on the power lines is taken into account under the secondary condition (20b). The condition from equation (4) is taken into account by the secondary condition (20c). The secondary condition (20d) takes into account the limitation of the deviation of the grid frequency from the nominal frequency. In this case, $\overline{\Delta f}$ represents the maximum permitted frequency deviation.

The variables $K_P^{t_n}$, $K_S^{t_n}$, $P_T^{t_n}$, $P_F^{\infty,1,t_n}$, $P_F^{\infty,1,t_n}$ are defined below:

The variables $K_P^{t_n}$, $K_S^{t_n}$, $P_T^{t_n}$ are adjustable parameters. In this case, those nodes for which primary control power and secondary control power can be set are denoted using the index set $N_K$ for $k_P^{t_n}$ and $k_{S,i}^{t_n}$. In contrast, those nodes whose produced active power can be manipulated are denoted using the index set $N_P$ for $P_{d,i}^{t_n}$. That is to say, $k_{P,i}^{t_n}$, $k_{S,i}^{t_n}$, $i \in N_K^{t_n}$ and $P_{d,i}^{t_n}$ $i \in N_P$ can be manipulated by the grid operator. The permitted sets for $k_P^{t_n}$, $k_S^{t_n}$ and $P_d^{t_n}$ are therefore as follows:

$$K_P^{t_n} = \{k_P^{t_n} \in \mathbb{R}_{\geq 0}^N : k_{P,i}^{t_n} = k_{P,i}^{0,t_n}, \forall i \in N \backslash N_K\} \quad (21)$$

$$K_S^{t_n} = \{k_S^{t_n} \in \mathbb{R}_{\geq 0}^N : k_{S,i}^{t_n} = k_{S,i}^{0,t_n}, \forall i \in N \backslash N_K\} \quad (22)$$

$$P_T^{t_n} = \{P_d^{t_n} \in \mathbb{R}^N : P_{d,i}^{t_n} = P_{d,i}^{0,t_n}, \forall i \in N \backslash N_P\} \quad (23)$$

In this case, $k_{P,i}^{0,t_n} \geq 0$, $k_{S,i}^{0,t_n}$ and $P_{d,i}^{0,t_n}$ are predefined, non-adjustable parameters for those nodes which cannot be manipulated at the time $t_n$. $\mathbb{R}_{\geq 0}^N$ denotes an N-dimensional vector having non-negative real numbers. Under certain circumstances, the sets $N_K$ and $N_P$ are also temporally variable, but this is not considered any further here.

The fluctuations or uncertainties $\Delta P_s^{t_n}$ and $\Delta P_f^{t_n}$ are unknown. However, it is known that these variables are in a convex set which corresponds to a tolerance range in the sense of the claims. Two convex sets are considered in this case. In a first case, each element of the vectors $\Delta P_s^{t_n}$, $\Delta P_f^{t_n}$ can vary freely in a predetermined interval independently of other elements, that is to say:

$$|\Delta P_s^{t_n}| \leq \overline{\Delta P_s^{t_n}}, |\Delta P_f^{t_n}| \leq \overline{\Delta P_f^{t_n}} \quad (24)$$

In this case, $\overline{\Delta P_s^{t_n}}$, $\overline{\Delta P_f^{t_n}} \in \mathbb{R}_{\geq 0}^N$ are known limits, and $\Delta P_{s,i}^{t_n} = 0$ or $\Delta P_{f,i}^{t_n} = 0$ if slow and fast variations at the node i are not permitted at the time $t_n$. Symmetrical intervals are considered below. Similar results can also be derived for asymmetrical intervals.

In a second case, the convex set or the tolerance range is defined using a global uncertainty limit which is given by the following scalar uncertainty:

$$\overline{\Delta P_s^{t_n}}^{-T} |\Delta P_s^{t_n}| \leq 1, \overline{\Delta P_f^{t_n}}^{-T} |\Delta P_f^{t_n}| \leq 1 \quad (25)$$

In this case, $\overline{\Delta P_s^{t_n}}^{-1} = [\overline{\Delta P_{s,i}^{t_n}}^{-1}]$ denotes the element inverse of $\Delta P_s^{t_n}$, whereas $\overline{\Delta P_s^{t_n}}^{-T}$ is the transpose of $\overline{\Delta P_s^{t_n}}^{-1}$. The difference between the tolerance range according to equation (24) and the tolerance range according to equation (25) is that the tolerance range according to equation (24) represents a weighted infinity norm uncertainty, that is to say all elements of $\Delta P_s^{t_n}$, $\Delta P_f^{t_n}$ can assume extreme values at any time. In contrast, the tolerance range according to equation (25) represents a weighted 1-norm uncertainty, that is to say the uncertainties are not independent of one another and not all elements of $\Delta P_s^{t_n}$, $\Delta P_f^{t_n}$ can simultaneously assume extreme values. The number of nodes with an uncertain load and/or an uncertain regenerative feed power/power production is denoted using $N_{P_s}$ and $N_{P_f}$ for slow and fast uncertainties, respectively. For the two convex sets mentioned, a total of $2N_{P_{s,f}}$ corner points result for the 1-norm and $2^{N_{P_{s,f}}}$ corner points result for the infinity norm. The corresponding sets of uncertainities are defined as follows:

$$P_F^{\infty,t_n}(\overline{\Delta P_f^{t_n}}) = \{\Delta P_f^{t_n} \in \mathbb{R}^N : |\Delta P_f^{t_n}| \leq \overline{\Delta P_f^{t_n}}\} \quad (26)$$

$$P_F^{1,t_n}(\overline{\Delta P_f^{t_n}}) = \{\Delta P_f^{t_n} \in \mathbb{1}^N : |\overline{\Delta P_f^{t_n}}^{-T} |\Delta P_f^{t_n}| \leq 1\} \quad (27)$$

$$P_S^{\infty,t_n}(\overline{\Delta P_s^{t_n}}) = \{\Delta P_s^{t_n} \in \mathbb{1}^N : |\Delta P_s^{t_n}| \leq \overline{\Delta P_f^{t_n}}\} \quad (28)$$

$$P_S^{1,t_n}(\overline{\Delta P_s^{t_n}}) = \{\Delta P_s^{t_n} \in \mathbb{1}^N : |\overline{\Delta P_s^{t_n}}^{-T} |\Delta P_s^{t_n}| \leq 1\} \quad (29)$$

For reasons of clarity, the arguments $\overline{\Delta P_f^{t_n}}$, $\overline{\Delta P_s^{t_n}}$, of $\Delta P_F^{\infty,1,t_n}$, $\Delta P_S^{\infty,1,t_n}$ are often omitted below.

The above problem (20) is a min-max optimization problem which is difficult to solve since it contains a non-linear combination of $k_P^{t_n}$ and $\Delta P_f^{t_n}$ and $k_S^{t_n}$ and $\Delta P_s^{t_n}$ in the secondary condition (20b). Like document DE 10 2013 221 750 A1, this optimization problem is converted into a convex optimization problem. The converted convex optimization problem and further simplifications of this optimization problem are described below.

According to the convex optimization problem, a grid with a known topology and known susceptances $b_{ik}$ and power limitations W,γ on the power lines is considered. Furthermore, power estimates $P_e^{t_n}$ and uncertainty limits $\overline{\Delta P_s^{t_n}}$, $\overline{\Delta P_f^{t_n}}$ for slow and fast variations in these power estimates are known. The primary control power $k_P^{t_n}$ and the secondary control power $k_S^{t_n}$ and the planned produced powers $P_d^{t_n}$ are optimally determined, while minimizing their costs, by solving the following optimization problem:

$$\min_{\substack{\mu^{t_n}>0 \\ k^{t_n} \in \mathbb{R}_{\geq 0}^N \\ k_S^{t_n} \in \kappa_S^{t_n} \\ p_d^{t_n} \in P_T^{t_n}}} \sum_{t_n=0}^{T_n} c_d^T P_d^{t_n} + \tilde{c}_P^T k^{t_n} + c_S^T |k_S^{t_n}| \quad (30a)$$

under the secondary conditions:

$$|WB^T L^\dagger (P_e^{t_n} + P_d^{t_n} + (\mathbb{I} - k_s^{t_n} 1^T)\Delta P_s^{t_n} + (\mathbb{I} - k^{t_n} 1^T)\Delta P_f^{t_n})| \leq \gamma 1 \quad (30b)$$

$$1^T k_S^{t_n} = 1 \quad (30c)$$

$$1^T k^{t_n} = 1 \quad (30d)$$

$$1^T (P_e^{t_n} + P_d^{t_n}) = 0 \quad (30e)$$

$$-\overline{\Delta f} \leq \mu^{t_n} 1^T \Delta P_f^{t_n} \leq \overline{\Delta f} \quad (30f)$$

$$e_i^T k^{t_n} = \mu^{t_n} k_{P,i}^{0,t_n}, \forall i \in \overline{N_K} \quad (30g)$$

$$\forall \Delta P_s^{t_n} \in \overline{P_S^{\infty,1,t_n}}, \Delta P_f^{t_n} \in \Delta P_s^{t_n} \in \overline{P_S^{\infty,1,t_n}}, \forall t_n \quad (30h)$$

In this case, $\overline{P_S^{\infty,1,t_n}}$, $\overline{P_F^{\infty,1,t_n}}$ denote sets of corner points of $P_S^{\infty,t_n}$, $P_F^{\infty,t_n}$ and $P_S^{1,t_n}$, $P_F^{1,t_n}$. The resulting allocation of primary control power is given by $$k_P^{t_n} = \frac{1}{\mu^{t_n}} k^{t_n}.$$

In the above optimization problem, the non-linear term comprising $k_P^{t_n}$ is linearized by the reformulation $$k_P^{t_n} = \frac{1}{\mu^{t_n}} k^{t_n}.$$

This also influences the cost function in which the cost vector $\tilde{c}_P$ is used instead of the cost vector $c_P$. An increasing number of variable loads or regenerative energy producers results in a combinationally increasing number of corner points and therefore in a significant increase in the number of secondary conditions. Consequently, in a further variant, the above convex optimization problem is simplified for using the 1-norm uncertainty or the infinity norm uncertainty.

According to the simplification based on the infinity norm uncertainties according to equation (24), the primary control power, the secondary control power and the planned produced power can be optimally distributed, while minimizing their costs, by solving the following optimization problem:

$$\min_{\substack{\mu^{t_n}>0 \\ k^{t_n} \in \mathbb{R}_{\geq 0}^N \\ k_S^{t_n} \in \kappa_S^{t_n} \\ p_d^{t_n} \in P_T^{t_n}}} \sum_{t_n=0}^{T_n} c_d^T P_d^{t_n} + \tilde{c}_P^T k^{t_n} + c_S^T |k_S^{t_n}| \quad (31a)$$

under the secondary conditions:

$$|WB^T L^\dagger (P_e^{t_n} + P_d^{t_n})| + \quad (31b)$$
$$|WB^T L^\dagger (\mathbb{I} - k_S^{t_n} 1^T)|\overline{\Delta P_s^{t_n}} + |WB^T L^\dagger (\mathbb{I} - k^{t_n} 1^T)|\overline{\Delta P_f^{t_n}} \leq \gamma 1$$

$$1^T k_S^{t_n} = 1 \quad (31c)$$

$$1^T k^{t_n} = 1 \quad (31d)$$

$$1^T (P_e^{t_n} + P_d^{t_n}) = 0 \quad (31e)$$

$$\mu^{t_n} 1^T \overline{\Delta P_f^{t_n}} \leq \overline{\Delta f} \quad (31f)$$

$$e_i^T k^{t_n} = \mu^{t_n} k_{P,i}^{0,t_n}, \forall i \in \overline{N_K}, \forall t_n \quad (31g)$$

For 1-norm uncertainties according to equation (25), the primary control power, the secondary control power and the planned produced power can be optimally distributed, while minimizing their costs, by solving the following optimization problem:

$$\min_{\substack{\mu^{t_n}>0 \\ k^{t_n} \in \mathbb{R}_{\geq 0}^N \\ k_S^{t_n} \in \kappa_S^{t_n} \\ p_d^{t_n} \in P_T^{t_n}}} \sum_{t_n=0}^{T_n} c_d^T P_d^{t_n} + \tilde{c}_P^T k^{t_n} + c_S^T |k_S^{t_n}| \quad (32a)$$

under the secondary conditions:

$$|WB^T L^\dagger (P_e^{t_n} + P_d^{t_n})| + \left\| |WB^T L^\dagger (\mathbb{I} - k^{t_n} 1^T)| diag(\overline{\Delta P_s^{t_n}}) \right\|_{row,max} + \quad (32b)$$
$$\left\| |WB^T L^\dagger (\mathbb{I} - k^{t_n} 1^T)| diag(\overline{\Delta P_f^{t_n}}) \right\|_{row,max} \leq \gamma 1$$

$$1^T k_S^{t_n} = 1 \quad (32c)$$

$$1^T k^{t_n} = 1 \quad (32d)$$

$$1^T (P_e^{t_n} + P_d^{t_n}) = 0 \quad (32e)$$

$$\mu^{t_n} \max_i \overline{\Delta P_f^{t_n}} \leq \overline{\Delta f} \quad (32f)$$

$$e_i^T k^{t_n} = \mu^{t_n} k_{P,i}^{0,t_n}, \forall i \in \overline{N_K}, \forall t_n \quad (32g)$$

where $\|X\|_{row,max}$ is the row maximum norm of a matrix X, that is to say:

$$\left\| \begin{pmatrix} x_1^T \\ \vdots \\ x_n^T \end{pmatrix} \right\|_{row,max} = \begin{pmatrix} \|x_1\|_\infty \\ \vdots \\ \|x_n\|_\infty \end{pmatrix} \quad (33)$$

The resulting allocation of the primary control power is as follows:

$$k_P^{t_n} = \frac{1}{\mu^{t_n}} k^{t_n}.$$

Both of the optimization problems (31) and (32) just mentioned are convex. In this case, the infinity norm optimization problem according to equation (31) has stricter secondary conditions than the 1-norm optimization problem according to equation (32). Additional secondary conditions are usually taken into account in the optimization problems (30), (31) and (32); for example, limits of the powers produced by the nodes or the primary and secondary control powers held are stipulated, that is to say:

$$|P_{I,i}^{t_n}| = k_{P,i}^{t_n} \frac{|1^T \Delta P_f^{t_n}|}{1^T k_P^{t_n}} \leq P_{I,i,max}^{t_n} \tag{34}$$

$$|P_{II,i}^{t_n}| \leq P_{II,i,max}^{t_n} \tag{35}$$

$$|P_{e,i}^{t_n}| + |P_{d,i}^{t_n}| + P_{I,i,max}^{t_n} + P_{II,i,max}^{t_n} \leq P_{i,max}^{t_n} \tag{36}$$

In this case, $P_{I,i,max}^{t_n}$ denotes the limit for the primary control power, $P_{II,i,max}^{t_n}$ denotes the limits for the secondary control power and $P_{i,max}^{t_n}$ denotes the limit for the power produced by the node i at the time $t_n$.

In addition, additional secondary conditions which link the various time steps to one another are often considered. For example, it is possible to take into account the fact that the non-regenerative power plants can pass through only limited power changes. This can be introduced by the following secondary condition $$|P_{d,i}^{t_n} - P_{d,i}^{t_{n+1}}| \leq \Delta P_{d,i}^{max}$$

In this case, $\Delta P_d^{max}$ describes the maximum permissible change in the power production of the non-regenerative energy producer at the node i in the time interval $t_{n+1} - t_n$.

The above convex optimization problems can be solved in a manner known per se using known algorithms, for example the gradient descent method or the inner point method. Depending on the configuration, the optimization algorithms can be designed differently. In one variant, the optimization is carried out once a day and the optimized distribution of the powers is then valid for the next 24 hours. This implies that slow uncertainties $\Delta P_s^{t_n}$ usually become very large. This in turn means that the optimization must be relatively conservative. In another variant, the optimization is carried out repeatedly every 15 minutes for the next 24 hours, that is to say with an advancing time horizon which uses updated estimates for the load and the regenerative feed power. As a result of these updated estimates, slow fluctuations $\Delta P_s^{t_n}$ become considerably smaller for the first hours. The robust optimization must therefore be less conservative.

The embodiments of the invention described above have a number of advantages. In particular, a common optimization for the planned feed power/power production of nodes in a grid and the distribution of primary control power and secondary control power to the nodes are achieved for the first time. In this case, the optimization ensures stable operation of the grid since the secondary conditions of a maximum deviation of the grid frequency from the nominal frequency and a limitation of the power on the power lines are taken into account. Uncertainties in the power production, which result from variable loads and regenerative energy producers, are also taken into account as part of the optimization.

The optimization according to embodiments of the invention makes it possible to operate a grid closer to its physical limits. This makes it possible to reduce investment costs for the hardware of the grid and makes it possible to integrate more regenerative energy producers in existing grids. The method of embodiments of the invention is also particularly suitable for grids which trade energy and/or primary and secondary control powers on energy markets. Nevertheless, the method can also be used for grids without energy markets, for example large island grids.

The invention claimed is:

1. A method for computer-aided control of power in an electrical grid, the electrical grid having a predefined nominal frequency and comprising a plurality of nodes which are connected to one another via power lines, the plurality of nodes comprising a first energy producer from one or more non-regenerative energy production installations, a second energy producer from one or more regenerative energy production installations, and an energy consumer from one or more energy consumption units, the electrical grid containing both one or more first and second energy producers and one or more energy consumers, a power estimate being predefined for a respective node, which power estimate is composed of an estimate of a future load of the energy consumer and an estimate of a regenerative power produced in the future by the second energy producer in the respective node, wherein the power estimate does not include planned power of the first energy producer, and fluctuations of a first type in the power estimates being allowed for respective nodes in a first predefined tolerance range and fluctuations of a second type in the power estimates being allowed for the respective nodes in a second predefined tolerance range, in which case the fluctuations of the first type are compensated for by primary control power in the electrical grid and the fluctuations of the second type are compensated for by secondary control power in the electrical grid, the method comprising:
   a) modeling a steady state of the electrical grid, in which a steady-state grid frequency is established for all voltages of the nodes; and
   b) solving an optimization problem including determining and setting planned power produced by the first energy producer and allocating primary control powers and secondary control powers to the respective nodes by means of the modeled steady state on a basis of the power estimates and the first tolerance range and the second tolerance range in such a manner that a deviation of the steady-state grid frequency from the predefined nominal frequency and a power on the power lines are minimized.

2. The method as claimed in claim 1, wherein the optimization problem is defined as an optimization of a cost function which contains a sum of a plurality of cost terms, the cost terms containing at least one of: a first cost term for the primary control powers allocated to the respective nodes or deviations of these primary control powers from predefined desired values and a second cost term for the secondary control powers allocated to the respective nodes or deviations of these secondary control powers from predefined desired values.

3. The method as claimed in claim 1, wherein the cost function also comprises a third cost term for the planned powers produced by the first energy producers of the nodes or for deviations of these powers from desired values.

4. The method as claimed in claim 1, wherein the steady-state of the electrical grid is modeled on the basis of load flow equations for the powers occurring in the respective nodes.

5. The method as claimed claim 1, wherein at least one of: the first tolerance range and the second tolerance range is defined in such a manner that the fluctuation of at least one of the first type and the second type in the power estimate is in a predetermined tolerance interval for each node.

6. The method as claimed in claim 1, wherein at least one of the first tolerance range and the second tolerance range is defined in such a manner that a weighted sum of the fluctuations of at least one of the first type and the second type in the power estimates is less than or equal to a predetermined value for all nodes.

7. The method as claimed in claim 1, wherein, when solving the optimization problem, the secondary condition, whereby the planned powers produced by at least one of the first energy producers, the primary control powers, and the secondary control powers allocated to the respective nodes are minimized, is taken into account.

8. The method as claimed in claim 1, wherein the optimization problem is converted into a convex optimization problem as part of its solution.

9. An apparatus for computer-aided control of the power in an electrical grid, the electrical grid having a predefined nominal frequency and comprising a plurality of nodes which are connected to one another via power lines and the plurality of nodes comprising a first energy producer from one or more non-regenerative energy production installations, a second energy producer from one or more regenerative energy production installations, and an energy consumer from one or more energy consumption units, the electrical grid containing both one or more first and second energy producers and one or more energy consumers, a power estimate being predefined for a respective node, which power estimate is composed of an estimate of the future load of the energy consumer and an estimate of the future power of the second regenerative energy producer in the respective node, wherein the power estimate does not include planned power of the first energy producer, and fluctuations of a first type in the power estimates being allowed for respective nodes in a first predefined tolerance range and fluctuations of a second type in the power estimates being allowed for the respective nodes in a second predefined tolerance range, in which case the fluctuations of the first type are compensated for by primary control power in the electrical grid and the fluctuations of the second type are compensated for by secondary control power in the electrical grid, wherein the apparatus is set up to carry out a method in which:
  a) modeling a steady state of the grid, in which a steady-state grid frequency is established for all voltages of the nodes; and
  b) solving an optimization problem including determining and setting planned power produced by the first energy producer and allocating primary control powers and secondary control powers to the respective nodes by means of the modeled steady state on the basis of the power estimates and the first and second tolerance ranges in such a manner that the deviation of the steady-state grid frequency from the nominal frequency and the power on the power lines are minimized.

10. An electrical grid which has a predefined nominal frequency and comprises a plurality of nodes which are connected to one another via power lines and the plurality of nodes comprising a first energy producer from one or more non-regenerative energy production installations, a second energy producer from one or more regenerative energy production installations, and an energy consumer from one or more energy consumption units, the electrical grid containing both one or more first and second energy producers and one or more energy consumers, a power estimate being predefined for a respective node, which power estimate is composed of an estimate of the future load of the energy consumer and an estimate of the future power of the second regenerative energy producer in the respective node, wherein the power estimate does not include planned power of the first energy producer, and fluctuations of a first type in the power estimates being allowed for respective nodes in a first predefined tolerance range and fluctuations of a second type in the power estimates being allowed for the respective nodes in a second predefined tolerance range, in which case the fluctuations of the first type are compensated for by primary control power in the electrical grid and the fluctuations of the second type are compensated for by secondary control power in the electrical grid, wherein:
  the electrical grid comprises an apparatus for computer-aided control of the power that is set up to carry out a method in which:
  a) modeling a steady state of the grid, in which a steady-state grid frequency is established for all voltages of the nodes; and
  b) solving an optimization problem including determining and setting planned power produced by the first energy producer and allocating primary control powers and secondary control powers to the respective nodes by means of the modeled steady state on the basis of the power estimates and the first and second tolerance ranges in such a manner that the deviation of the steady-state grid frequency from the nominal frequency and the power on the power lines are minimized.

11. The apparatus as claimed in claim 9, wherein the optimization problem is defined as an optimization of a cost function which contains a sum of a plurality of cost terms, the cost terms containing at least one of a first cost term for the primary control powers allocated to the respective nodes or deviations of these primary control powers from predefined desired values, and a second cost term for the secondary control powers allocated to the respective nodes or deviations of these secondary control powers from predefined desired values.

12. The apparatus as claimed in claim 11, wherein the cost function also comprises a third cost term for the planned powers produced by the first energy producers of the nodes or for deviations of these powers from desired values.

13. The apparatus as claimed in claim 9, wherein the steady-state of the electrical grid is modeled on the basis of load flow equations for the powers occurring in the respective nodes.

14. The apparatus as claimed in claim 9, wherein at least one of the first tolerance range and the second tolerance range is defined in such a manner that the fluctuation of at least one of the first type and the second type in the power estimate is in a predetermined tolerance interval for each node.

15. The apparatus as claimed in claim 9, wherein at least one of the first tolerance range and the second tolerance range is defined in such a manner that a weighted sum of the fluctuations of at least one of the first type and the second type in the power estimates is less than or equal to a predetermined value for all nodes.

16. The apparatus as claimed in claim 9, wherein, when solving the optimization problem, the secondary condition, whereby the planned powers produced by at least one of the first energy producers, the primary control powers, and the secondary control powers allocated to the respective nodes are minimized, is taken into account.

17. The apparatus as claimed in claim 9, wherein the optimization problem is converted into a convex optimization problem as part of its solution.

* * * * *